(12) United States Patent
Hur et al.

(10) Patent No.: US 10,530,615 B1
(45) Date of Patent: Jan. 7, 2020

(54) ADAPTIVE POWER EQUALIZATION IN ELECTRICAL BALANCE DUPLEXERS

(71) Applicant: Apple Inc., Cupertino, CA (US)

(72) Inventors: Joonhoi Hur, Sunnyvale, CA (US); Rastislav Vazny, Sunnyvale, CA (US); Ronald William Dimpflmaier, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/297,235

(22) Filed: Mar. 8, 2019

(51) Int. Cl.
| | |
|---|---|
| *H03H 7/40* | (2006.01) |
| *H04L 25/03* | (2006.01) |
| *H04B 1/58* | (2006.01) |
| *H04B 1/04* | (2006.01) |

(52) U.S. Cl.
CPC ..... *H04L 25/03019* (2013.01); *H04B 1/0475* (2013.01); *H04B 1/581* (2013.01); *H04B 1/586* (2013.01)

(58) Field of Classification Search
CPC ......... H04L 25/03019; H04L 25/03057; H04L 25/03038; H03H 7/38; H03H 7/463
USPC .......................... 375/229, 232; 708/322, 323
See application file for complete search history.

(56) References Cited

U.S. PATENT DOCUMENTS

| | | |
|---|---|---|
| 8,369,807 B2 | 2/2013 | Mikhemar et al. |
| 8,854,155 B2 | 10/2014 | Mikhemar et al. |
| 2017/0012762 A1* | 1/2017 | Chang .................... H04B 1/525 |
| 2017/0187510 A1* | 6/2017 | van Liempd ............ H03H 7/40 |
| 2018/0226367 A1 | 8/2018 | Babcock et al. |
| 2018/0226941 A1* | 8/2018 | van Liempd .......... H04B 1/525 |
| 2019/0207633 A1* | 7/2019 | Huusari .................... H01P 5/18 |

OTHER PUBLICATIONS

Darabi, et al.; "Highly Integrated and Tunable RF Front Ends for Reconfigurable Multiband Transceivers: A Tutorial"; IEEE Transactions on Circuits and Systems—I: Regular Papers, vol. 58, No. 9, Sep. 2011.

\* cited by examiner

*Primary Examiner* — Khai Tran (74) *Attorney, Agent, or Firm* — Fletcher Yoder, P.C.

(57) ABSTRACT

The representative embodiments discussed in the present disclosure relate to techniques in which isolation between transmission signals and received signals in a transceiver may be maintained across a range of transceiver operating conditions, such as across range of output powers of a power amplifier of the transceiver. More specifically, an electrical balance duplexer may be implemented to include an adaptive power equalizer and a power equalizer control such that the attenuation of the electrical balance duplexer may be adjusted based on the transceiver operating conditions. For instance, a method may be employed to determine the output power of the power amplifier and to adjust the attenuation of the adaptive power equalizer based in part on the output power to maintain isolation between the transmission signals and the received signals.

20 Claims, 9 Drawing Sheets

ADAPTIVE POWER EQUALIZATION IN ELECTRICAL BALANCE DUPLEXERS

BACKGROUND

The present disclosure relates generally to techniques for facilitating radio frequency (RF) communications, and more particularly, to transceivers with an adaptive power equalizing electrical balance duplexer.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transceivers are found in various electronic devices, and particularly, portable electronic devices such as, for example, phones, computers, internet connectivity routers, such as Wi-Fi routers or modems, radios, televisions, or any of various other stationary or handheld devices. Certain types of transceivers, known as wireless transceivers, may generate wireless signals to be transmitted by way of an antenna in the transceiver. Moreover, certain transceivers may facilitate full-duplex communication, allowing for high speed data transmission. A full-duplex transceiver may concurrently transmit and receive radio-frequency (RF) data signals via an antenna coupled to the transceiver. Accordingly, the transceiver may isolate a signal transmitted via the antenna (e.g., a transmission signal) from a signal concurrently received via the antenna (e.g., a received signal) and vice versa such that distortion or noise introduced by the received signal in the transmission signal is reduced or eliminated and distortion or noise introduced by the transmission signal on the received signal is reduced or eliminated. However, certain operating conditions (e.g., power, voltage, impedance, and/or the like) of the transceiver may impact the isolation between the transmission signal and the received signal. For example, an increase in an output power of a power amplifier of the transceiver may reduce the isolation between the transmission signal and the received signal, which may increase distortion in one or both of the transmission signal and the received signal.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As described in greater detail below, to isolate signals concurrently transmitted from and received at the antenna of the transceiver, the transceiver may include an electrical balance duplexer (EBD). The electrical balance duplexer may isolate the signals based at least in part on electrical balance (e.g., impedance). Accordingly, the electrical balance duplexer may include an impedance tuner (e.g., a balancing network, impedance tuner circuitry, and/or the like). However, the power amplifier of the transceiver may use different levels of output power under different operating conditions (e.g., based on a distance between the transceiver and a base station), which may impact the performance of the impedance tuner. More specifically, due to nonlinear large signal operation, the voltage swing and/or impedance resulting from the impedance tuner may change with changing power amplifier output power. As a result, the isolation provided by the electrical balance duplexer may be degraded at certain power amplifier output powers compared to the isolation provided by the electrical balance duplexer at other power amplifier output powers. To that end, cellular devices, which may use a higher power amplifier output power compared to other electronic devices, may suffer from degraded signal quality and/or signal strength compared to those devices.

Accordingly, to improve the isolation between transmission signals and received signals, the electrical balance duplexer may be implemented to provide adaptive power equalization. More specifically, the electrical balance duplexer may be implemented to include an adaptive power equalizer (e.g., adaptive power equalizer circuitry, linearizer circuitry, attenuation circuitry, and/or the like) and a power equalizer control (e.g., power equalizer control logic and/or circuitry). As described in greater detail below, the power equalizer control may be implemented to adjust the attenuation and/or impedance of the adaptive power equalizer to control the average voltage swing of the impedance tuner. The impedance tuner may include a desired voltage swing range. For instance, when the impedance tuner is operating within the desired voltage swing range, the electrical balance duplexer may provide a desired level of isolation (e.g., in decibels) between the transmission signals and the received signals. However, as discussed above, the voltage swing of the impedance tuner may be impacted by the output power of the power amplifier. Accordingly, in some embodiments, the power equalizer control may determine the output power of the power amplifier and may adjust the attenuation of the adaptive power equalizer based in part on the output power to maintain the average voltage swing of the impedance tuner within the desired voltage swing range (e.g., to maintain the desired isolation between the transmission signals and the received signals).

Accordingly, the representative embodiments discussed in the present disclosure relate to techniques in which isolation between transmission signals and received signals in a transceiver may be maintained across a range of transceiver operating conditions, such as across range of output powers of a power amplifier of the transceiver. More specifically, in some embodiments, an electrical balance duplexer may be implemented to include an adaptive power equalizer and a power equalizer control such that the attenuation of the electrical balance duplexer may be adjusted based on the transceiver operating conditions. For instance, a method may be employed to determine the output power of the power amplifier and to adjust the attenuation of the adaptive power equalizer based in part on the output power to maintain isolation between the transmission signals and the received signals.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
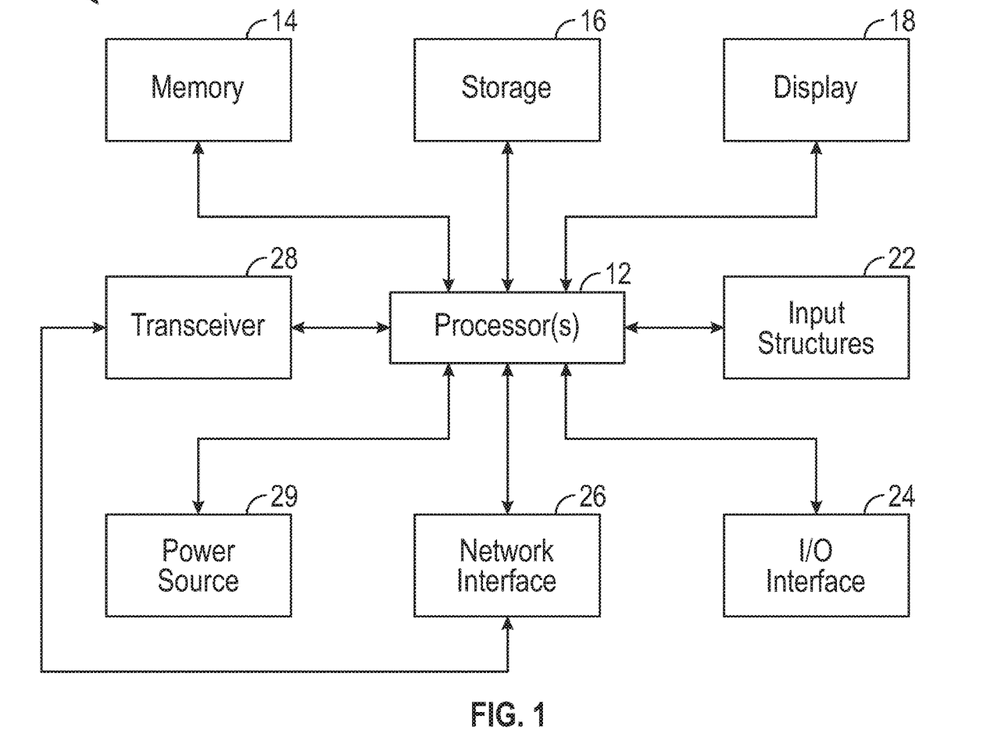
FIG. 1 is a schematic block diagram of an electronic device including a transceiver, in accordance with an embodiment.

With the foregoing in mind, a general description of suitable electronic devices that may employ a transceiver that includes an adaptive power equalizing electrical balance duplexer will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
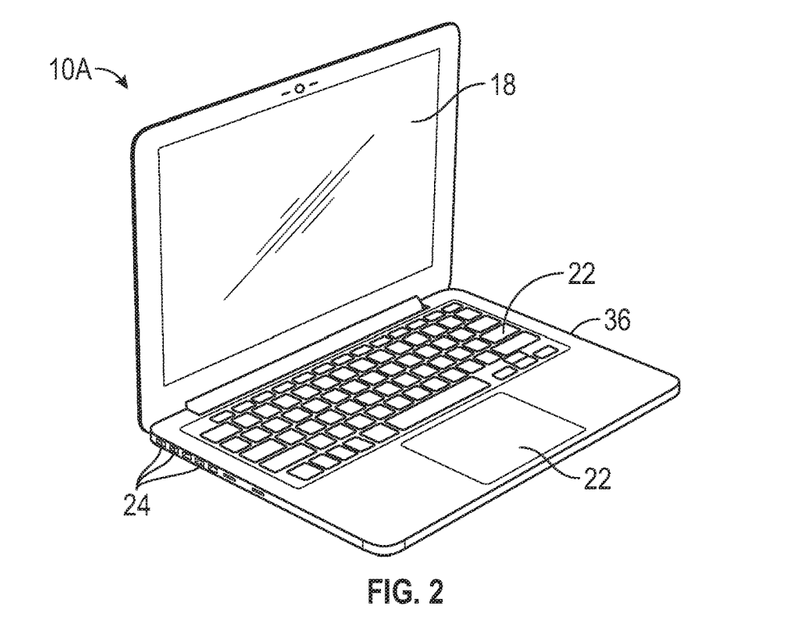
FIG. 2 is a perspective view of a notebook computer representing an embodiment of the electronic device of FIG. 1.
Figure 3:
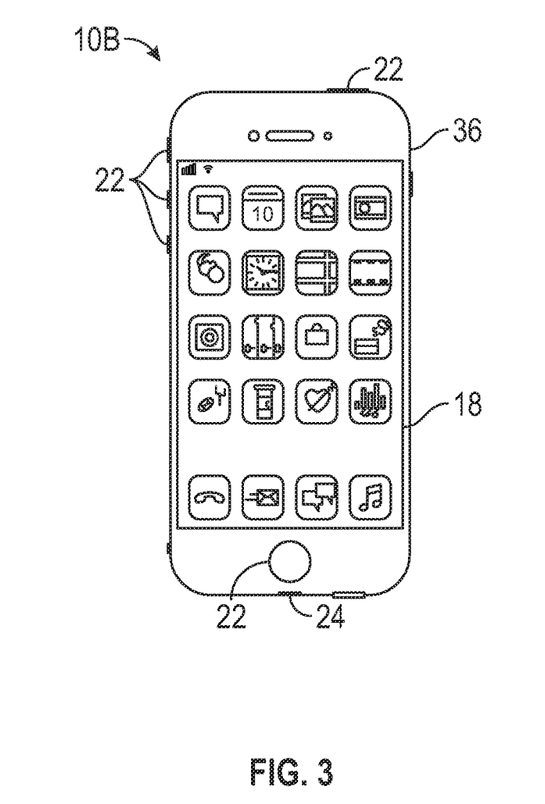
FIG. 3 is a front view of a hand-held device representing another embodiment of the electronic device of FIG. 1.
Figure 4:
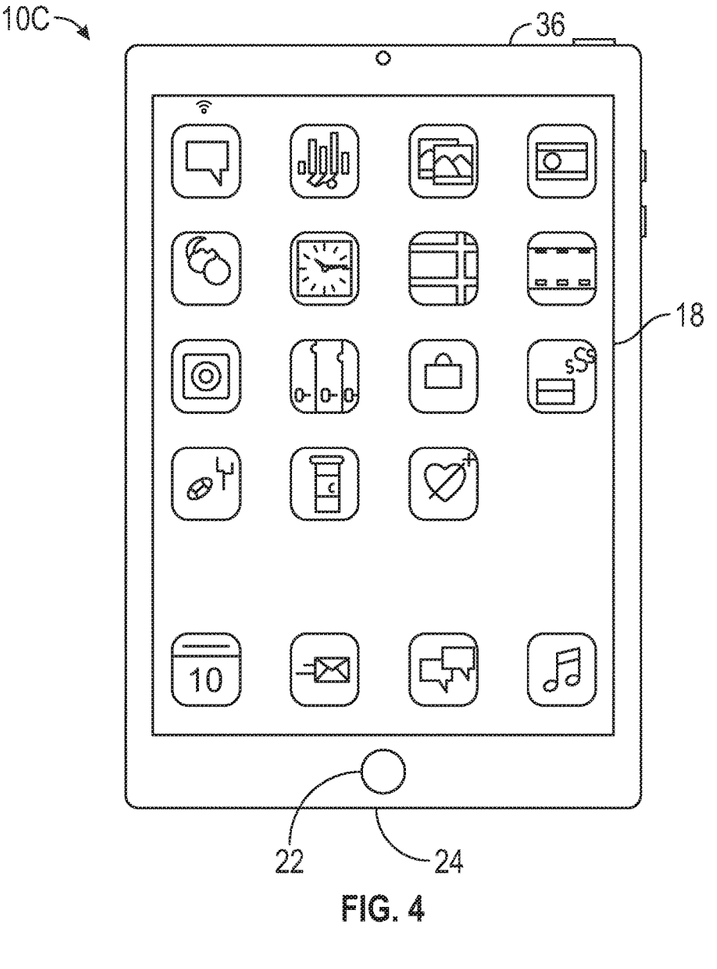
FIG. 4 is a front view of another hand-held device representing another embodiment of the electronic device of FIG. 1.
Figure 5:
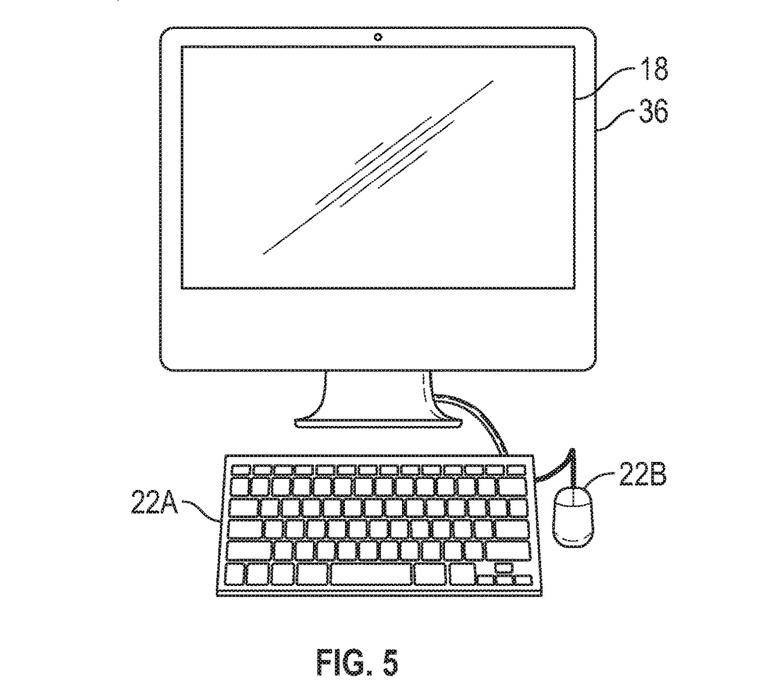
FIG. 5 is a front view of a desktop computer representing another embodiment of the electronic device of FIG. 1.
Figure 6:
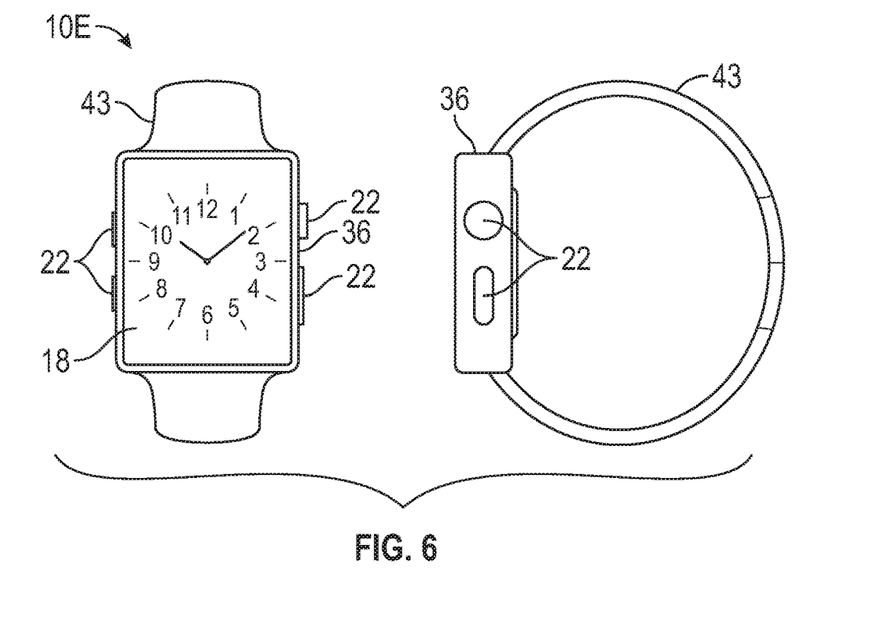
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, 4th generation (4G) cellular network, $5^{th}$ generation (5G) cellular network, long term evolution (LTE) cellular network, long term evolution enhanced license assisted access (LTE-eLAA) cellular network, or long term evolution advanced (LTE-A) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, 5G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, 5G, and LTE, LTE-eLAA, and LTE-A cellular networks), WiMAX networks, mobile WiMAX networks, ADSL and VDSL networks, DVB-T and DVB-H networks, UWB networks, and so forth. Further, as described below, the transceiver 28 may facilitate bi-directional communication (e.g., full-duplex communication). For instance, in some embodiments the transceiver 28 may be implemented to operate using frequency division duplexing (FDD). That is, for example, the transceiver 28 may synchronously (e.g., concurrently) transmit a transmission signals in a first frequency band and may receive a received signal in a second frequency band different from the first frequency band. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

Input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
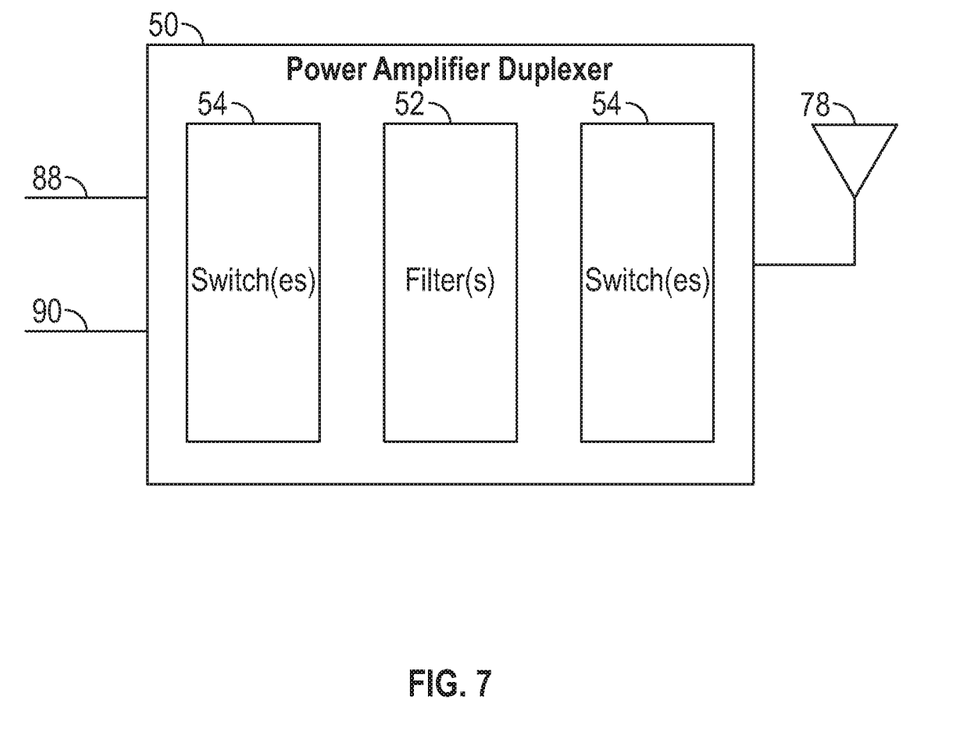
FIG. 7 is a schematic diagram of a power amplifier duplexer, in accordance with an embodiment.

As previously noted above, each embodiment (e.g., notebook computer 10A, handheld device 10B, handheld device 10C, computer 10D, and wearable electronic device 10E) of the electronic device 10 may include a transceiver 28. In some embodiments, to facilitate full-duplex communication, the transceiver 28 may include a duplexer, such as a power amplifier duplexer (PAD) 50. With the foregoing in mind, FIG. 7 depicts a schematic block diagram of an embodiment of a power amplifier duplexer 50 within the transceiver 28. The various functional blocks shown in FIG. 7 may include hardware elements (including circuitry), software elements (including computer code stored on a computer-readable medium) or a combination of both hardware and software elements. It should also be noted that FIG. 7 is merely one example of a particular implementation and is intended to illustrate the types of components that may be present in the PAD 50. As such, functional blocks may be added or omitted, and their arrangement within the PAD 50 may be modified.

In some embodiments, the PAD 50 may be implemented to isolate signals transmitted by the transceiver 28 via a transmitter signal path 88 (e.g., transmission signals) from signals received at the transceiver 28 via a receiver signal path 90 (e.g., received signals) based at least in part on a difference in frequency, timing, and/or a coding scheme between the transmission signals and the received signals. For instance, in some embodiments, the transceiver 28 may be implemented to facilitate bi-directional communication using frequency division duplexing (FDD). That is, for example, the transceiver 28 may synchronously (e.g., concurrently) and/or asynchronously (e.g., consecutively) transmit the transmissions signals in a first frequency band and may receive the received signals in a second frequency band different from the first frequency band. Accordingly, the PAD 50 may include filtering circuitry, such as a number of frequency-selective filters 52 (e.g., surface acoustic wave and/or thin film bulk acoustic resonator filters). In operation, the filters 52 may provide isolation between signals on the transmitter signal path 88 and signals on the receiver signal path 90 based on a frequency difference between the signals on the respective signal paths. For instance, a first filter 52 communicatively coupled to the transmitter signal path 88 may be implemented to attenuate (e.g., reduce and/or remove) received signals (e.g., noise on the transmitter signal path) to isolate the transmission signals, and second filter 52 communicatively coupled to the receiver signal path 90 may be implemented to prevent the transmission signals (e.g., noise on the transmitter signal path) from leaking into and/or overloading the receiver.

While the filters 52 may provide a low insertion loss, they support a single frequency band. To that end, to support multi-band operation, the transceiver 28 may be implemented to include multiple power amplifier duplexers 50 and/or filters 52. In such embodiments, power amplifier duplexer 50 may be connected to an antenna 78 (e.g., an RF antenna) through antenna switches 54, and thus, a series of switches 54 may be used in addition to multiple filters 52 to provide proper isolation of the transmitter and receiver (e.g., the transmitter path 88 and the receiver path 90, respectively). As expected, integrating the switches 54 and filters 52 may result in bulky and/or costly circuitry (e.g., in terms of power consumption, area consumption, fabrication costs and/or the like).

Figure 8:
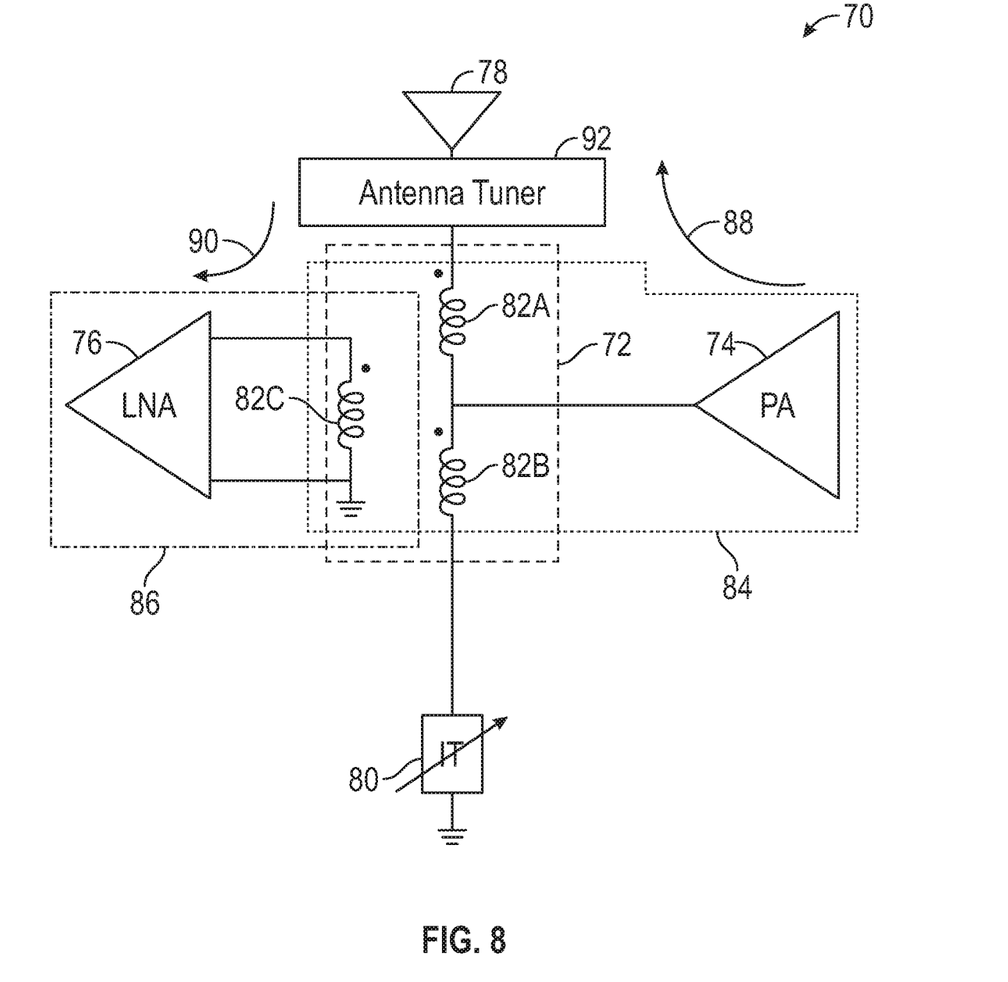
FIG. 8 is schematic block diagram of an electrical balance duplexer, in accordance with an embodiment.

Accordingly, as illustrated in FIG. 8, the transceiver 28 may additionally or alternatively include a duplexer implemented to isolate the transmission signals and the received signals based at least in part on electrical balance (e.g., impedance). More specifically, FIG. 8 illustrates an electrical balance duplexer 70, which may be included in the transceiver 28. Because the electrical balance duplexer 70 isolates signals based in part on an electrical balance, the electrical balance duplexer 70 may operate independently from the differences in frequency, timing, and/or coding schemes associated with transmission signals and/or received signals described above. Thus, as illustrated, the electrical balance duplexer 70 may be implemented with a reduced number of filters and/or switches and/or may be implemented without filters and/or switches. To that end, the area involved in implementing the electrical balance duplexer 70 may be reduced. Moreover, the electrical balance duplexer 70 may operate under fewer frequency constraints. As such, the electrical balance duplexer 70 may support transceiver 28 operation according to multiple communication standards. That is, for example, the electrical balance duplexer 70 may increase the operational flexibility of the transceiver 28 by enabling the transceiver 28 to operate according to additional communication standards and/or to dynamically switch between operation under different communication standards.

As illustrated, in some embodiments, the electrical balance duplexer 70 may be implemented with a hybrid transformer 72, which may be implemented to couple a power amplifier (PA) 74, a low noise amplifier (LNA) 76, an antenna 78, and an impedance tuner 80 (e.g., a balancing impedance) via a hybrid junction (e.g., a four-port hybrid junction). For example, a first inductor 82A and a second inductor 82B of the hybrid transformer may be communicatively coupled to the antenna 78 and the power amplifier 74 to form a transmitter port 84 of the hybrid transformer 72. Further, a third inductor 82C of the hybrid transformer 72 may be magnetically coupled to the first inductor 82A and the second inductor 82B, as well as communicatively coupled to the low noise amplifier 76, to form a receiver port 86 of the hybrid transformer 72.

The electrical balance duplexer 70 may be implemented such that the transmitter port 84 is isolated from the receiver port 86 and vice versa at the hybrid transformer 72, which may isolate the transmitter signal path 88 from the receiver signal path 90. For example, to isolate the ports, the electrical balance duplexer 70 may be implemented to provide an electrical balance between the transmitter port 84 and the receiver port 86 by balancing (e.g., matching) the impedance of the impedance tuner 80 with the impedance of the antenna 78 (e.g., antenna impedance). However, the antenna impedance may vary during operation of the transceiver 28. For example, the antenna impedance may change based in part on the output power (Pout) of the power amplifier 74, which may adjust based in part on a distance between the electronic device 10 and a base station. Accordingly, in some embodiments, the transceiver 28 and/or the electrical balance duplexer 70 may be implemented to adjust the impedance tuner 80 and/or an antenna tuner 92 (e.g., antenna tuner circuitry) to alter the impedance resulting from the impedance tuner 80 and/or the antenna 78, respectively, during operation of the transceiver 28.

However, the operation of the transceiver 28 may additionally impact the operating characteristics of the impedance tuner 80. More specifically, due to the nonlinearity of the impedance tuner 80 under large signal operation, the voltage swing at the impedance tuner 80 may change with changes in the output power (Pout) of the power amplifier 74 (e.g., output power at output circuitry of the power amplifier 74). As a result, the impedance at the impedance tuner 80 may also vary with the changes in the output power (Pout) of the power amplifier 74, which may degrade the isolation between the transmitter signal path 88 and the receiver signal path 90 provided by the electrical balance duplexer.

Figure 9:
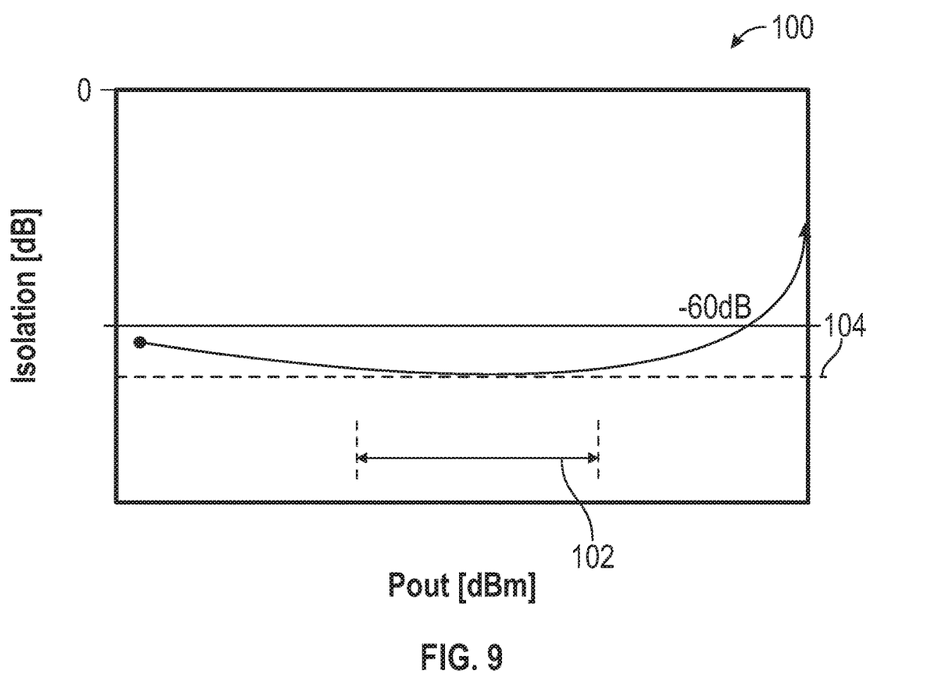
FIG. 9 is a graph plotting an example of isolation between a transmitter port and a receiver port of the transceiver resulting from the electrical balance duplexer of FIG. 8 as a function of an output power of a power amplifier of the transceiver, in accordance with an embodiment.

Turning now to FIG. 9, to help illustrate the effect of the output power (Pout) of the power amplifier on the impedance tuner 80 and, in turn, the electrical balance duplexer 70, the graph 100 plots an example of the isolation in decibels (dB) provided by the electrical balance duplexer 70 as a function of the output power (Pout) of the power amplifier in decibels. As illustrated, within a certain range 102 of output powers (Pout) of the power amplifier 74, the electrical balance duplexer 70 may provide a desired isolation 104 (e.g., in decibels) between the transmitter port 84 and the receiver port 86. In some embodiments, the desired isolation 104 may result at least in part from the impedance tuner 80 operating within a desired voltage swing range for output powers (Pout) of the power amplifier 74 within the range 102. Accordingly, in some embodiments, to maintain desired isolation 104 between the transmitter signal path 88 and the receiver signal path 90, the electrical balance duplexer 70 may be implemented to maintain the average voltage swing of the impedance tuner 80 within the desired voltage swing range.

Figure 10:
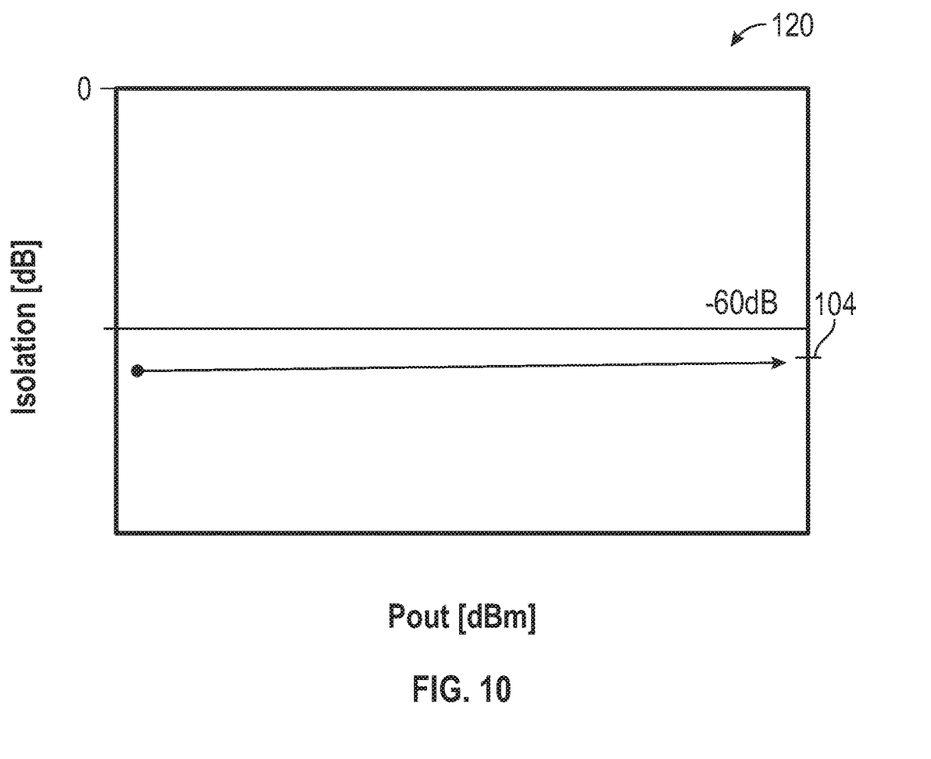
FIG. 10 is a graph plotting an example of isolation between the transmitter port and the receiver port of the transceiver resulting from an adaptive power equalizing electrical balance duplexer as a function of the output power of the power amplifier of the transceiver, in accordance with an embodiment.

FIG. 10 illustrates a graph 120 plotting an example of the isolation in decibels (dB) provided by the electrical balance duplexer 70 as a function of the output power (Pout) of the power amplifier in decibels, where the electrical balance duplexer 70 is implemented to maintain the average voltage swing of the impedance tuner 80 within the desired voltage swing range described above. As illustrated, across the range of output powers (Pout) of the power amplifier 74, the electrical balance duplexer 70 is implemented to provide the desired isolation 104 between the transmitter signal path 88 and the receiver path 90. Further, by maintaining the average voltage swing of the impedance tuner 80 within the desired voltage swing range, the impedance of the impedance tuner 80 may remain fixed regardless of the output power (Pout) of the power amplifier 74. To that end, the linearity and isolation of the embodiment of the electrical balance duplexer 70 described with reference to FIG. 10 are each improved over the linearity and isolation of the embodiments of the electrical duplexer 70 described with reference to FIG. 9.

Figure 11:
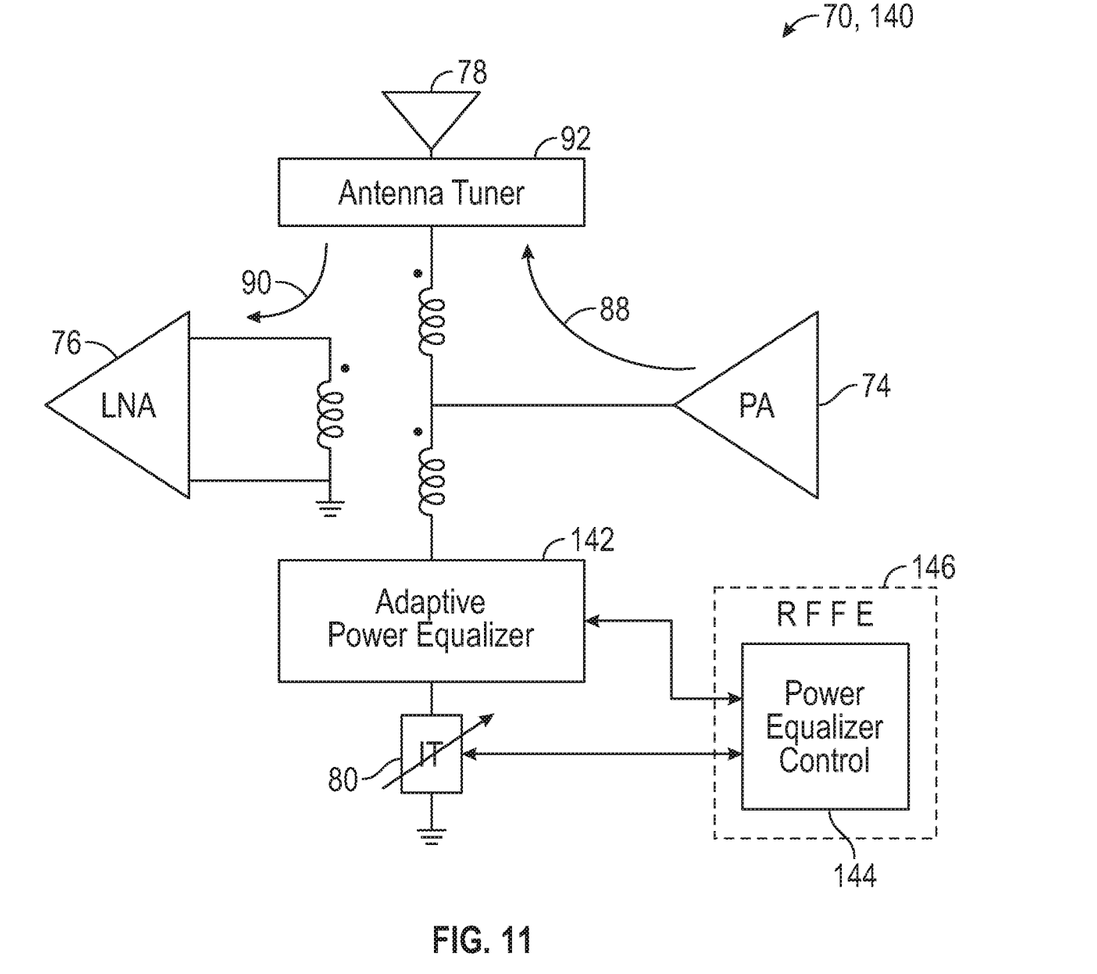
FIG. 11 is a schematic block diagram of the adaptive power equalizing electrical balance duplexer, in accordance with an embodiment.

Turning now to FIG. 11, an electrical balance duplexer 70 implemented to maintain the average voltage swing of the impedance tuner 80 within the desired voltage swing range is shown. More specifically, an embodiment of adaptive power equalizing electrical balance duplexer (EBD) 140, which includes an adaptive power equalizer 142 (e.g., adaptive power equalizer circuitry, linearizer circuitry, attenuation circuitry, and/or the like) and a power equalizer control 144, is shown. As described in greater detail below, the power equalizer control 144 may be implemented to adjust the attenuation and/or impedance of the adaptive power equalizer 142 to control the average voltage swing of the impedance tuner 80. In some embodiments, for example, the power equalizer control 144 may determine the output power (Pout) of the power amplifier 74 and may adjust the attenuation of the adaptive power equalizer 142 based in part on the output power (Pout) to control the average voltage swing of the impedance tuner 80.

The power equalizer control 144 may be implemented as circuitry and/or logic included as a component of the transceiver 28, a modem (not shown) of the electronic device 10, the adaptive power equalizing EBD 140, and/or the like. Moreover, in some embodiments, the power equalizer control 144 may be communicatively coupled to and/or controlled by a radio-frequency front-end interface (RFFE) 146 of the transceiver 28, a serial peripheral interface (SPI) of the transceiver 28 (not shown), and/or the like. To that end, embodiments described herein are intended to be illustrative and not limiting.

Figure 12:
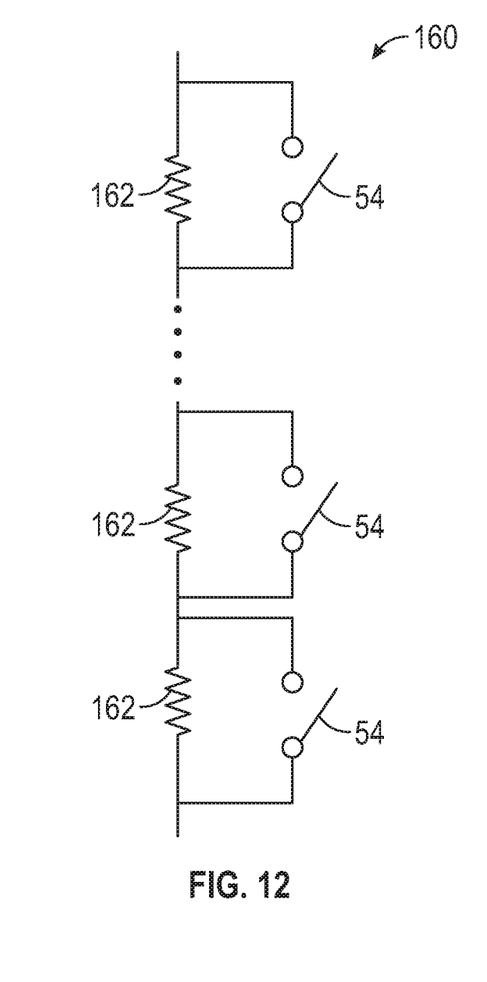
FIG. 12 is a schematic diagram of a series attenuator, in accordance with an embodiment.
Figure 13:
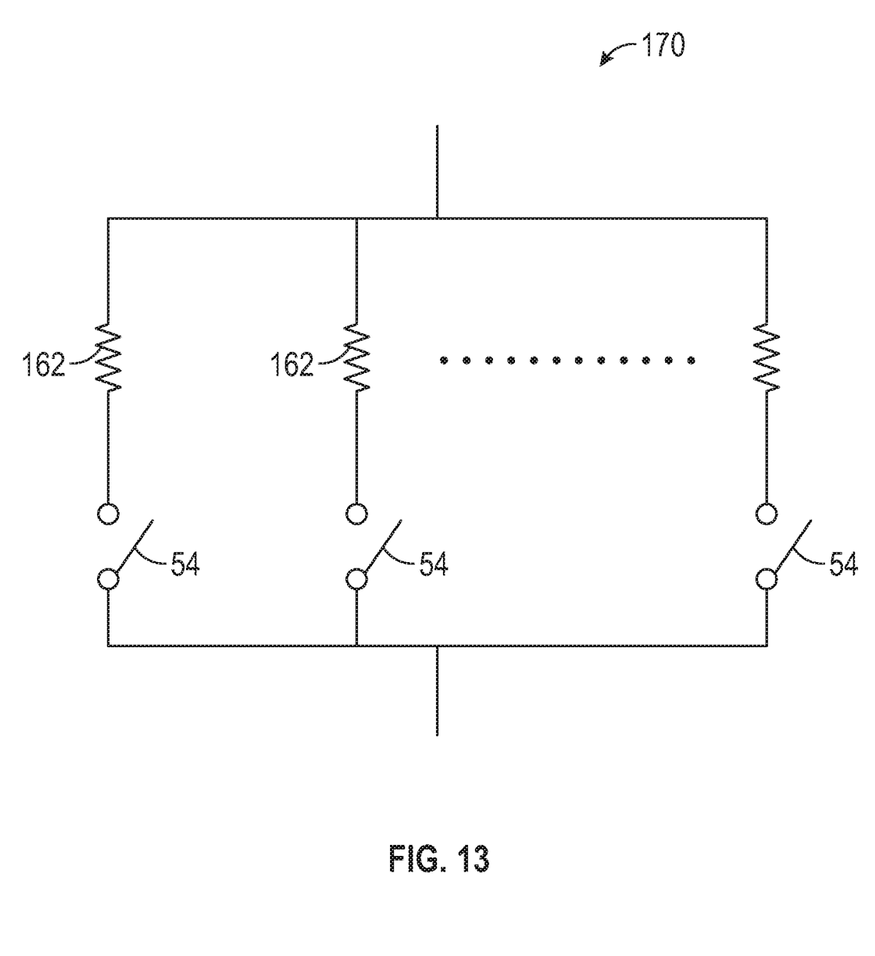
FIG. 13 is a schematic diagram of a parallel attenuator, in accordance with an embodiment.

With reference now to FIGS. 12 and 13, the adaptive power equalizer 142 may be implemented with a series attenuator 160, a parallel attenuator 170, or a combination thereof. As illustrated, both the series attenuator 160 and the parallel attenuator 170 may respectively include a number of impedance elements 162 (e.g., resistors, capacitors, inductors, and/or the like) and a number of switches 54. In operation, a subset of the switches 54 may selectively be opened (e.g., in an off state) or closed (e.g., in an on state) to adjust the attenuation of the adaptive power equalizer 142. That is, for example, the impedance of the series attenuator 160 and/or the parallel attenuator 170 may be adjusted based in part on the respective connectivity of the impedance elements 162, which may be determined by the state of the switches 54.

For simplicity, the series attenuator 160 and the parallel attenuator 170 are described herein as illustrative examples of elements used to implement the adaptive power equalizer 142. However, it may be appreciated that any combination of suitable logic and/or circuitry, such as a resonant circuit (e.g., an LC circuit), may additionally or alternatively be used to implement the adaptive power equalizer 142. That is, embodiments described herein are intended to be illustrative and not limiting.

Figure 14:
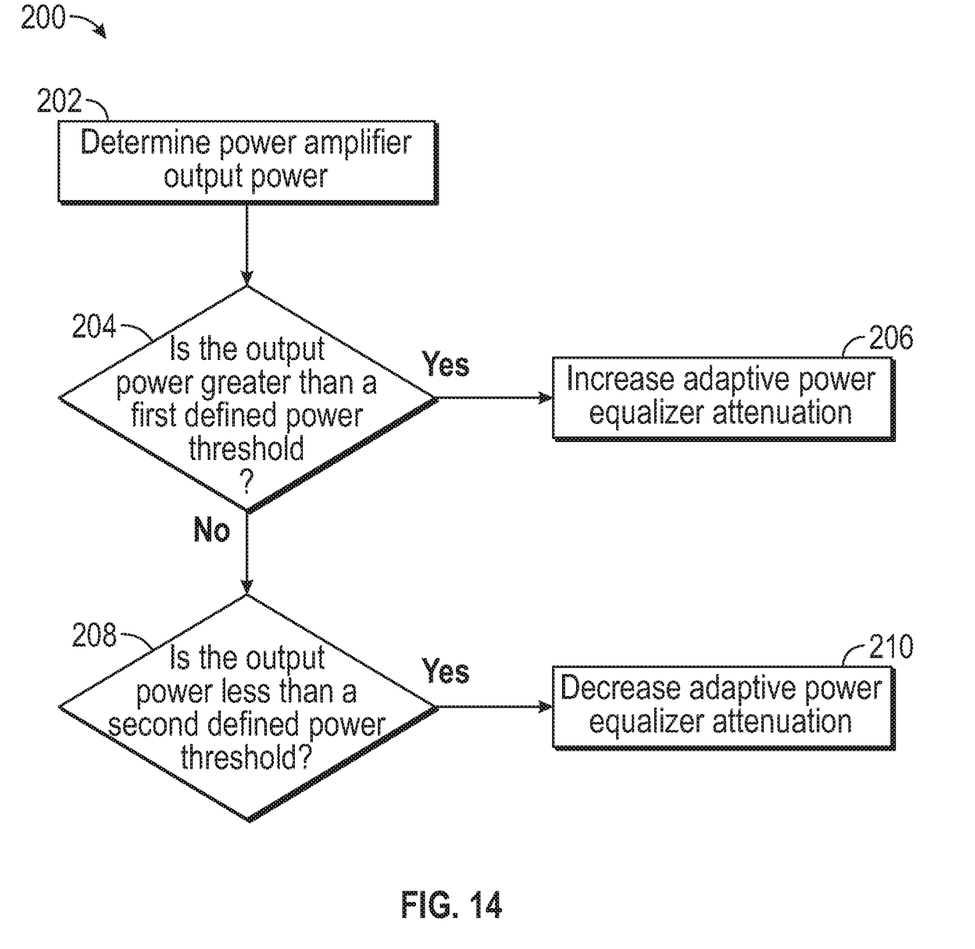
FIG. 14 is a flow chart of a method for adjusting the attenuation of the adaptive power equalizer based at least in part on the output power of the power amplifier of the transceiver, in accordance with an embodiment.

A flow chart of a method 200 for adjusting the attenuation of the adaptive power equalizer 142 based at least in part on the output power (Pout) of the power amplifier 74 is shown in FIG. 14, in accordance with embodiments described herein. Although the description of the method 200 is described in a particular order, which represents a particular embodiment, it should be noted that the method 200 may be performed in any suitable order, and steps may be added or omitted. Moreover, while the method 200 is described as being performed by the power equalizer control 144, it may be appreciated that the method may additionally or alternatively be performed by the electronic device 10, the transceiver 28, the adaptive power equalizing EBD 140, the RFFE 146, and/or the like.

To initiate the method 200, the power equalizer control 144 may be implemented to determine the output power (Pout) of the power amplifier 74 (process block 202). For example, in some embodiments, the power equalizer control 144 may receive a measurement of the output power (Pout) of the power amplifier 74. Additionally or alternatively, the power equalizer control 144 may receive a signal representative of (e.g., proportional to) the output power (Pout) of the power amplifier 74. For instance, the power equalizer control 144 may be implemented to determine a current, voltage level, and/or the like of a signal configured to control the output power (Pout) of the power amplifier 74.

After determining the output power (Pout) of the power amplifier 74, the power equalizer control 144 may determine whether the output power (Pout) is greater than a first defined power threshold, such as a maximum power threshold (decision block 204). In some embodiments, the first defined power threshold may be a value stored in memory 14, nonvolatile storage 16, and/or the like. For example, in some embodiments, the first defined power threshold may be stored in a look up table (LUT), a register, and/or the like. Additionally or alternatively, the first defined power threshold may be a power level, a voltage level, a current, and/or the like, which may be produced by circuitry and/or logic within the electronic device 10. Accordingly, in some embodiments, the power equalizer control 144 may determine a difference between the output power (Pout) and the first defined power threshold after retrieving and/or receiving the first defined power threshold.

In some embodiments, the first defined power threshold may be determined during calibration and/or testing of the electronic device 10. For example, based on test data corresponding to the electronic device 10 and/or a set of devices having similar characteristics (e.g., operating characteristics) to the electronic device 10, a maximum output power level of the power amplifier 74 that maintains for which the electrical balance duplexer 70 may provide the desired isolation 104 (e.g., in decibels) between the transmitter port 84 and the receiver port 86 may be determined. This maximum output power level may correspond to the first defined power threshold and/or an upper limit of the range 102. Further, in some embodiments, after determining the first defined power threshold, the electronic device 10 may be initialized with the first defined power threshold. Additionally or alternatively, the first defined power threshold may be set or adjusted in response to a certain event (e.g., power up, reset, and/or initialization of the electronic device 10) and/or device condition (e.g., frequency, power, isolation between the transmitter port 84 and the receiver port 86 and/or the like).

If the output power (Pout) is greater than the first defined power threshold, the power equalizer control 144 may increase the attenuation of the adaptive power equalizer 142 (process block 206). For instance, the power equalizer control 144 may cause one or more switches 54 in the adaptive power equalizer 142 to change states (e.g., from open to closed or vice versa) such that the total impedance of the adaptive power equalizer 142 is increased. Additionally or alternatively, a current and/or a voltage supplied to the adaptive power equalizer 142 may be adjusted.

Moreover, in some embodiments, the power equalizer control 144 may cause the adaptive power equalizer 142 to increase attenuation by a particular amount (e.g., fixed amount and/or percentage). For example, the electronic device 10 may include a mapping, such as a table and/or a LUT, between a set of output powers (Pout) (e.g., output power levels) and corresponding attenuation levels that may result in the desired isolation 104 (e.g., in decibels) between the transmitter port 84 and the receiver port 86. In some embodiments, the electronic device 10 may be initialized (e.g., calibrated) with the mapping. Additionally or alternatively, the electronic device 10 may dynamically update the mapping based in part on performance characteristics, such as the isolation between the transmitter port 84 and the receiver port 86, during device operation.

If, on the other hand, the output power (Pout) is not greater than the first defined power threshold, the power equalizer control 144 may determine whether the output power (Pout) is less than a second defined power threshold, such as a minimum power threshold (decision block 208). In some embodiments, the second defined power threshold may be a value stored in memory 14, nonvolatile storage 16, and/or the like. For example, as described above, the second defined power threshold may be stored in a LUT, a register, and/or the like. Additionally or alternatively, the second defined power threshold may be a power level, a voltage level, a current, and/or the like, which may be produced by circuitry and/or logic within the electronic device 10. Accordingly, in some embodiments, the power equalizer control 144 may determine a difference between the output power (Pout) and the second defined power threshold after retrieving and/or receiving the second defined power threshold.

As described above with reference to the first defined power threshold, the second defined power threshold may be determined during calibration and/or testing of the electronic device 10. For example, based on test data corresponding to the electronic device 10 and/or a set of devices having similar characteristics (e.g., operating characteristics) to the electronic device 10, a minimum output power level of the power amplifier 74 that maintains for which the electrical balance duplexer 70 may provide the desired isolation 104 (e.g., in decibels) between the transmitter port 84 and the receiver port 86 may be determined. This minimum output power level may correspond to the second defined power threshold and/or a lower limit of the range 102. Further, in some embodiments, after determining the second defined power threshold, the electronic device 10 may be initialized with the second defined power threshold. Additionally or alternatively, the second defined power threshold may be set or adjusted in response to a certain event (e.g., power up, reset, and/or initialization of the electronic device 10) and/or device condition (e.g., frequency, power, isolation between the transmitter port 84 and the receiver port 86 and/or the like).

If the output power (Pout) is less than the second defined power threshold, the power equalizer control 144 may decrease the attenuation of the adaptive power equalizer 142 (process block 210). For instance, the power equalizer control 144 may cause one or more switches 54 in the adaptive power equalizer 142 to change states (e.g., from open to closed or vice versa) such that the total impedance of the adaptive power equalizer 142 is decreased. Additionally or alternatively, a current and/or a voltage supplied to the adaptive power equalizer 142 may be adjusted. Moreover, as described above with reference to causing increased attenuation, the power equalizer control 144 may decrease the attenuation of the adaptive power equalizer 142 by a certain amount (e.g., a fixed amount and/or a percentage) based at least in part on a mapping between the output power and the attenuation level.

If the output power (Pout) is determined to not be less than the second defined power threshold, the power equalizer control 144 may take no action. For instance, by determining the output power (Pout) is not greater than the first defined power threshold and is not less than the second defined power threshold, the power equalizer control 144 may determine the output power (Pout) is within the range 102. Accordingly, the impedance tuner 80 may provide the desired isolation 104 between the transmitter port 84 and the receiver port 86.

It may be appreciated that the power equalizer control 144 may perform the method 200 in real-time. That is, for example, the power equalizer control 144 may continue to determine the output power (Pout) of the power amplifier 74 and adjust the attenuation of the adaptive power equalizer 142, accordingly. Accordingly, the method 200 and/or a portion of the method 200 may be repeated any suitable number of instances. For example, after determining the output power (Pout) is not less than the second defined power threshold (decision block 208), increasing the attenuation of the adaptive power equalizer 142 (process block 206, or decreasing the attenuation of the adaptive power equalizer 142 (process block 210), the power equalizer control 144 may return to the beginning of the method 200 (e.g., process block 202). However, in some embodiments, the power equalizer control 144 may be implemented to perform the method 200 when the electronic device 10 is operating under certain conditions. For example, in some embodiments, the power equalizer control 144 may be implemented to perform the method 200 when the electronic device 10 has a remaining power level (e.g., battery life) above a certain threshold. Additionally or alternatively, the method 200 may be used with a regular periodicity (e.g., every millisecond (ms), every 5 ms, every 10 ms, and/or the like).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A transceiver, comprising:
a power amplifier comprising output circuitry, wherein the power amplifier is configured to output an output power at the output circuitry;
an impedance tuner; and
an adaptive power equalizing electrical balance duplexer (EBD) comprising an adaptive power equalizer communicatively coupled to the impedance tuner, wherein the adaptive power equalizing EBD is implemented to:
determine the output power, wherein the adaptive power equalizing EBD is communicatively coupled to the output circuitry;
in response to determining the output power is greater than a first defined power threshold, increase an attenuation of the adaptive power equalizer; and
in response to determining the output power is less than a second defined power threshold, decrease the attenuation of the adaptive power equalizer.

2. The transceiver of claim 1, wherein the adaptive power equalizing EBD comprises power equalizer control circuitry implemented to:
determine the output power;
in response to determining the output power is greater than the first defined power threshold, increase the attenuation of the adaptive power equalizer; and
in response to determining the output power is less than the second defined power threshold, decrease the attenuation of the adaptive power equalizer.

3. The transceiver of claim 2, comprising a radio-frequency front-end interface (RFFE), wherein the RFFE comprises the power equalizer control circuitry.

4. The transceiver of claim 1, wherein an electronic device comprises the transceiver and a memory, wherein the memory comprises the first defined power threshold, the second defined power threshold, or both.

5. The transceiver of claim 1, wherein the adaptive power equalizing EBD is implemented to:
increase the attenuation of the adaptive power equalizer by a first amount in response to determining the output power exceeds the first defined power threshold by a second amount; and
increase the attenuation of the adaptive power equalizer by a third amount in response to determining the output power exceeds the first defined power threshold by a fourth amount.

6. The transceiver of claim 1, wherein the adaptive power equalizing EBD is implemented to:
decrease the attenuation of the adaptive power equalizer by a first amount in response to determining the output power is less than the second defined power threshold by a second amount; and
decrease the attenuation of the adaptive power equalizer by a third amount in response to determining the output power is less than the second defined power threshold by a fourth amount.

7. The transceiver of claim 1, comprising an antenna having a first impedance, wherein the impedance tuner comprises a second impedance and is implemented to adjust the second impedance based at least in part on the first impedance.

8. The transceiver of claim 1, comprising:
a transmitter port, wherein the transmitter port comprises the power amplifier;
a receiver port comprising a low noise amplifier; and
an antenna, wherein the antenna is communicatively coupled to the transmitter port and the receiver port via a hybrid transformer of the adaptive power equalizing EBD.

9. The transceiver of claim 8, wherein the transceiver is configured to concurrently:
transmit a first signal from the transmitter port via the antenna; and
receive a second signal via the antenna at the receiver port.

10. The transceiver of claim 9, wherein the adaptive power equalizing EBD is configured to:
isolate first noise from the second signal in the first signal; and
isolate second noise from the first signal in the second signal.

11. The transceiver of claim 1, wherein the adaptive power equalizing EBD comprises a hybrid transformer, wherein the hybrid transformer comprises a number of inductors.

12. A transceiver configured to transmit a first signal from a transmitter port via an antenna and receive a second signal at a receiver port via the antenna, comprising:

a power amplifier of the transmitter port comprising output circuitry, wherein the power amplifier is configured to output an output power at the output circuitry;

an impedance tuner comprising an average voltage swing; and an adaptive power equalizing electrical balance duplexer (EBD) comprising an adaptive power equalizer communicatively coupled to the impedance tuner, wherein the adaptive power equalizing EBD is configured to adjust an attenuation of the adaptive power equalizer based at least in part on the output power, wherein the adaptive power equalizing EBD is communicatively coupled to the output circuitry, and wherein the average voltage swing of the impedance tuner is configured to adjust based at least in part on the attenuation.

13. The transceiver of claim 12, wherein the impedance tuner comprises a desired voltage swing range, wherein:

in response to the average voltage swing being within the desired voltage swing range, the adaptive power equalizing EBD is configured to provide a first isolation between the first signal and the second signal; and in response to the average voltage swing being outside the desired voltage swing range, the adaptive power equalizing EBD is configured to provide a second isolation different from the first isolation between the first signal and the second signal.

14. The transceiver of claim 13, wherein the adaptive power equalizing EBD is configured to adjust the attenuation of the adaptive power equalizer such that the average voltage swing of the impedance tuner is adjusted to within the desired voltage swing range.

15. The transceiver of claim 12, wherein the adaptive power equalizer comprises a series attenuator, a parallel attenuator, or a combination thereof.

16. The transceiver of claim 12, wherein the adaptive power equalizing EBD is configured to isolate the first signal and the second signal based at least in part on an electrical balance between the transmitter port and the receiver port.

17. A method of operating a transceiver, comprising:

determining, using an adaptive power equalizing electrical balance duplexer (EBD) of the transceiver, an output power at output circuitry of a power amplifier of the transceiver, wherein the adaptive power equalizing EBD is communicatively coupled to the output circuitry;

increasing, using the adaptive power equalizing EBD, an attenuation of an adaptive power equalizer of the adaptive power equalizing EBD in response to determining the output power is greater than a first defined power threshold; and decreasing, using the adaptive power equalizing EBD, the attenuation of the adaptive power equalizer of the adaptive power equalizing EBD in response to determining the output power is less than a second defined power threshold.

18. The method of claim 17, comprising determining the output power of the power amplifier with a regular periodicity.

19. The method of claim 17, comprising transmitting a first signal via the transceiver and receiving a second signal via the transceiver concurrently, wherein the adaptive power equalizing EBD is configured to isolate the first signal and the second signal.

20. The method of claim 17, wherein increasing the attenuation of the adaptive power equalizer of the adaptive power equalizing EBD, comprises:

increasing, using the adaptive power equalizing EBD, the attenuation of the adaptive power equalizer of the adaptive power equalizing EBD by a first amount in response to determining the output power is greater than the first defined power threshold by a second amount; and increasing, using the adaptive power equalizing EBD, the attenuation of the adaptive power equalizer of the adaptive power equalizing EBD by a third amount in response to determining the output power is greater than the first defined power threshold by a fourth amount.

* * * * *